United States Patent
Ikehara

[11] Patent Number: 5,819,521
[45] Date of Patent: Oct. 13, 1998

[54] STEEL CORD FOR REINFORCING A RUBBER PRODUCT AND PNEUMATIC TIRE USING THE SAME

[75] Inventor: Kiyoshi Ikehara, Chofu, Japan

[73] Assignee: Bridgestone Corporation, Tokyo, Japan

[21] Appl. No.: 772,768

[22] Filed: Dec. 24, 1996

[30]     Foreign Application Priority Data

Dec. 28, 1995  [JP]  Japan .................................. 7-342105
Dec. 28, 1995  [JP]  Japan .................................. 7-342107

[51] Int. Cl.⁶ ...................................................... D02G 3/36
[52] U.S. Cl. ................................. 57/902; 57/212; 57/213; 57/214; 57/218; 57/236; 57/237
[58] Field of Search ............................. 57/212, 213, 214, 57/218, 236, 237, 902

[56]              References Cited

U.S. PATENT DOCUMENTS

| | | | |
|---|---|---|---|
| 4,506,500 | 3/1985 | Miyasuchi et al. | 57/218 |
| 4,709,544 | 12/1987 | Charvet | 57/218 |
| 4,788,815 | 12/1988 | Umezawa | 57/212 |
| 5,661,966 | 9/1997 | Matsumaru | 57/212 |

FOREIGN PATENT DOCUMENTS

| | | | |
|---|---|---|---|
| 0040877 | 12/1981 | European Pat. Off. | |
| 997343 | 1/1952 | France. | |
| 5-272081 | 10/1993 | Japan | 57/237 |
| 621817 | 8/1978 | U.S.S.R. | 57/218 |
| 1034328 | 6/1996 | United Kingdom. | |

OTHER PUBLICATIONS

Patent Abstracts of Japan, 58–214403, Dec. 13, 1983.

*Primary Examiner*—William Stryjewski
*Attorney, Agent, or Firm*—Sughrue, Mion, Zinn, Macpeak & Seas, PLLC

[57]              ABSTRACT

A steel cord for reinforcing a rubber product has a multilayer structure consisting of two or more layers including a core, or a structure consisting of seven or more strands twisted in the same direction at the same pitch. In the steel cord, at least one of three strands that are successively adjacent to one another or that are in mutual contact is formed of two filaments that are paired substantially parallel to each other. The direction of pairing the two filaments of each strand is substantially the same over the entire length of the cord. Each of the remaining strands is formed of a single filament.

15 Claims, 9 Drawing Sheets

STEEL CORD FOR REINFORCING A RUBBER PRODUCT AND PNEUMATIC TIRE USING THE SAME

BACKGROUND OF THE INVENTION

1. Field of the Invention:

The present invention relates to a steel cord that is used as a reinforcing material for rubber products such as belts for industrial use, and also to a pneumatic tire using such a steel cord.

2. Discussion of Related Art:

Conventionally, steel cords have been embedded within rubber products to reinforce them. However, when a fissure is formed in a rubber product, water or the like may enter the rubber product and penetrate in the longitudinal direction of the cords, resulting in the expansion of corrosion along the cords. In order to overcome this problem, steel cords are required to allow rubber to penetrate into the interior of the cords.

For steel cords of a multilayer structure having two or more layers including a core, the following three types of cords have been proposed so improve the rubber penetration property.

(1) Open twist cord in which filaments are excessively formed so that clearances remain between the filaments.

(2) Cord in which the number and diameter of sheath strands are determined based on the diameter of the core strand so that clearances remain between the sheath filaments.

(3) Cord that has an improved structure such as 1×2, 2+2, 4×2, etc.

However, it is difficult for cords (1) and (3) to provide sufficient strength. Therefore, although these cords have been used in small tires as a reinforcing layer for protecting the inner layer from external damage, these cords are not suitable for reinforcing layers of medium or large tires. Although cord (2) easily provides sufficient strength, the filaments tend to be disposed unevenly, so that in some cases penetration of rubber becomes instable.

Meanwhile, a compact cord formed by twisting strands in the same direction at the same pitch has a merit of high productivity. However, when the compact cord is used as a reinforcing material for a rubber compound material, it becomes difficult for rubber to penetrate into the interior of the cord. Therefore, when such a compact cord is used in tires, there is a possibility that the wire element that does not adhere to the rubber comes out of the cord (walking wire), thus causing a puncture.

To solve the above-described problem, there has been proposed an improved compact cord in which the diameters of strands forming a cord are determined such that clearances are formed between the wires, thereby allowing rubber to penetrate into the interior of the cord.

This cord having an improved rubber penetration property can solve the problem of walking wire. However, since the penetration of rubber is not perfect, it cannot prevent water or the like from penetrating in the longitudinal direction of the cord, which would cause expansion of a corroded area.

SUMMARY OF THE INVENTION

An object of the present invention is to provide a steel cord of a multilayer structure or a compact structure that provides an excellent rubber penetration property, excellent resistance to expansion of corrosion, and excellent resistance to buckling fatigue, even though the above structures usually make it difficult for rubber to penetrate into the interior of the cord.

Another object of the present invention is provide a pneumatic radial tire that uses the above steel cord to enhance durability and to decrease the weight of the tire.

In order to achieve the above objects, the present invention provides a steel cord for reinforcing a rubber product which has a multilayer structure consisting of two or more layers including a core, or a structure consisting of seven or more strands twisted in the same direction at the same pitch. In the steel cord, at least one of three strands that are successively adjacent to one another or that are in mutual contact is formed of two filaments that are paired substantially parallel to each other. In the following description, a strand including two such filaments may be referred to as a "double filament strand." Each of the remaining strands is formed of a single filament, and the direction of pairing the two filaments of each strand is substantially the same over the entire length of the cord.

Preferably, each of the strands is formed of two filaments that are paired substantially parallel to each other.

More preferably, there exists the following relationship between the diameter Dm of a filament in a single filament strand and the diameter Dd of a filament in a double filament strand:

$$Dd \leq Dm \leq 2Dd.$$

The present invention also provides a pneumatic tire in which a steel cord having a structure that satisfies the above-described requirements is incorporated such that the direction of pairing of the two filaments of a double filament strand becomes substantially the same as the widthwise direction of a belt layer of the tire.

BRIEF DESCRIPTION OF THE ACCOMPANYING DRAWINGS

FIG. 22 is an explanatory view of a steel cord according to the present invention.

DESCRIPTION OF THE INVENTION AND PREFERRED EMBODIMENTS

Figure 21:
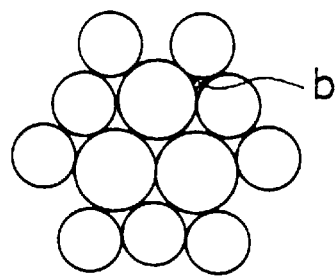
FIG. 21 is a cross-sectional view of a conventional compact cord including strands having different diameters.
Figure 21:
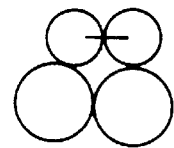
Figure 21:
Figure 21:
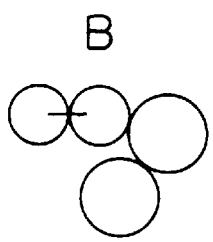
Figure 21:
Figure 21:
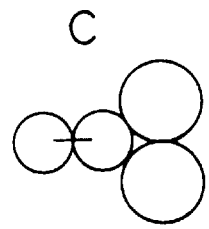

In conventional steel cords of a 1+n structure (see FIG. 5) or 1×2+n structure, spaces into which rubber cannot penetrate are formed even when sheath strands are disposed with clearances being formed therebetween. Similarly, in a compact cord (see FIG. 21) which includes strands having different diameters and in which the sheath strands are disposed so as to form clearances therebetween, the sheath strands are disposed unevenly, so that spaces into which rubber cannot penetrate are formed. Such spaces are indicated by "a" in FIG. 5 and by "b" in FIG. 21. Since the spaces extend continuously in the longitudinal direction, a portion corroded by invasion of water through a fissure expands along the cord.

Figure 1:
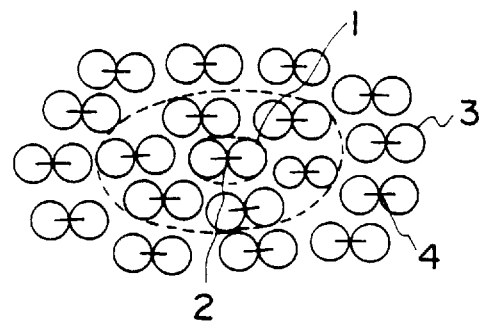
FIGS. 1–4 are cross-sectional views of steel cords according to the present invention.
Figure 2:
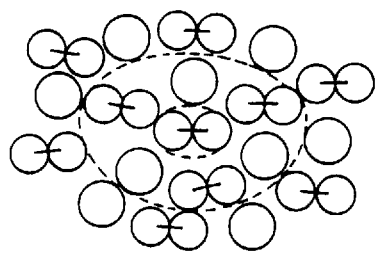
Figure 11:
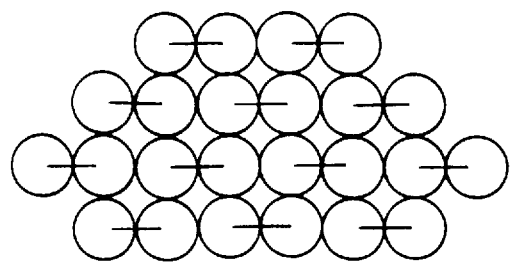
FIGS. 11–20 are cross-sectional views of steel cords according to the present invention.
Figure 12:
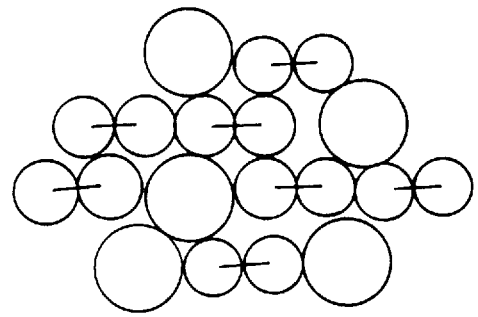
Figure 13:
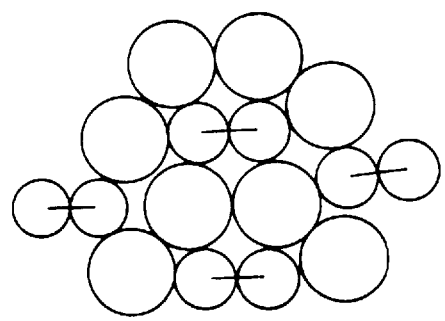
Figure 14:
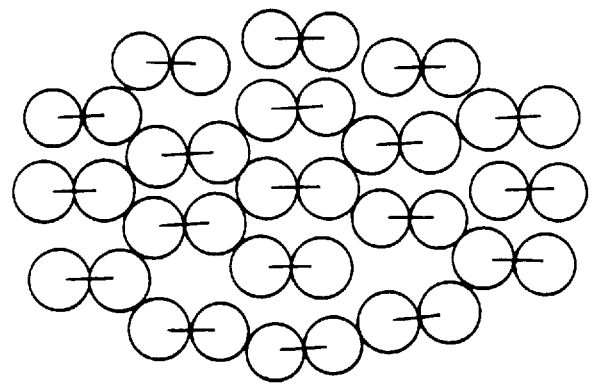
Figure 15:
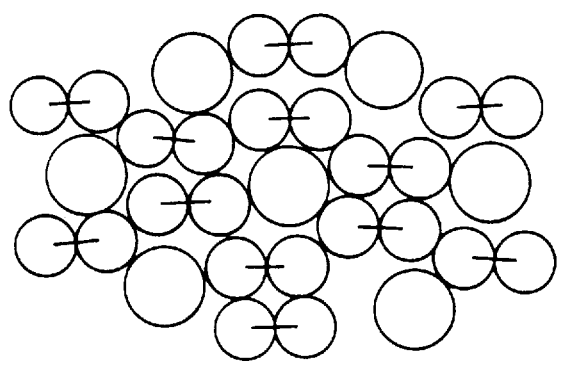
Figure 16:
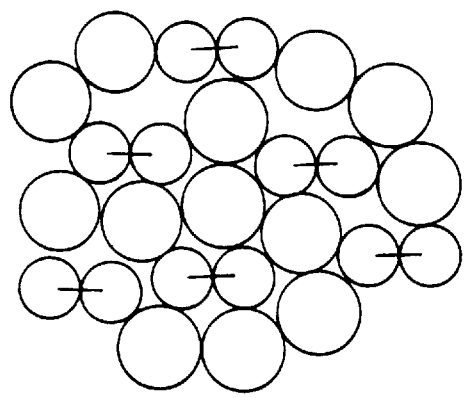
Figure 17:
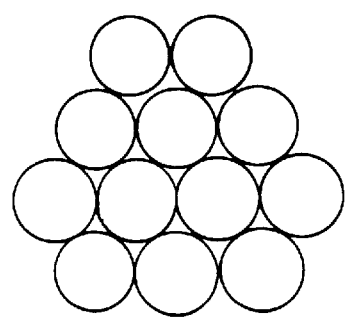
Figure 18:
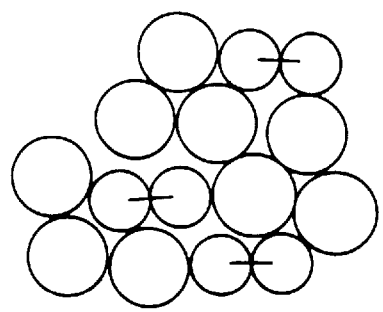
Figure 19:
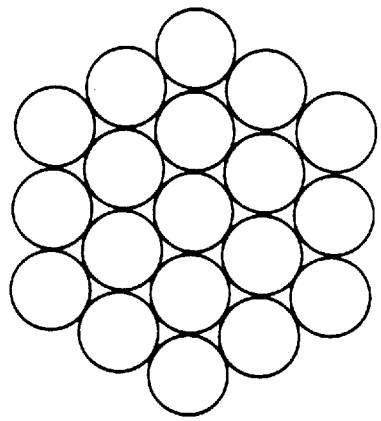
Figure 20:
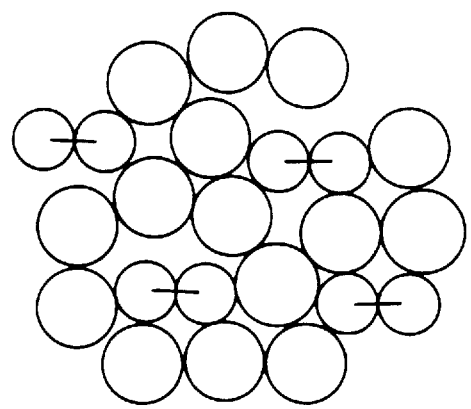

In order to solve the above-described problem, in the steel cord according to the present invention, at least one of three successively adjacent strands is formed of two filaments that are paired substantially parallel to each other (see FIGS. 1, 2, etc.). Therefore, the spaces as indicated by "a" in FIG. 5 into which rubber cannot penetrate do not extend continuously in the longitudinal direction, so that rubber can easily penetrate into the cord. Alternatively, at least one of three strands that are in mutual contact has a structure similar to the above (see FIGS. 11, 12, etc.). In this case as well, rubber penetration property is improved, so that movement of water or the like is prevented, and corrosion does not expand. In FIGS. 1, 11, etc., each line connecting two adjacent filaments indicates that the two filaments have been paired parallel to each other.

In the above-described structure, since at least one strand has two filaments that are paired substantially parallel with each other and since the direction of pairing the two filaments of such strand is substantially the same over the entire length of the cord, the cord can be made flat in a predetermined orientation. Therefore, when the steel cord of the present invention is used in a belt layer of a pneumatic tire, the gauge of the belt layer can be made thinner, so that the weight and size of the product can be reduced.

Especially, in the structure shown in FIG. 1, since the sheath strands are not required to be subjected to primary twisting, productivity is high and the strength of strands is prevented from decreasing.

Figure 4:
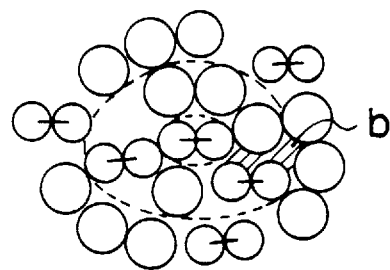

As described above, in the structure of the present invention, at least one of three strands that are successively adjacent to one another or that are in mutual contact is formed of two filaments that are paired substantially parallel to each other. This structure is employed because of the following two reasons.

a) If, as shown in FIG. 4, three successively adjacent sheath strands are ordinary strands each of which consists of a single filament, spaces into which rubber cannot penetrate are formed as indicated by "b" in FIG. 4, and the spaces tend to extend continuously in the longitudinal direction of the cord, so that the rubber penetration property degrades.

b) In a cord having a structure in which all three strands are in mutual contact, the cord can be twisted in a single manufacturing step by making the filaments of at least one of the strands parallel to each other. In addition, since contact positions between the strand and other element wires change at locations in the longitudinal direction (A→B→C in FIG. 22), portions which are not covered by the sheath strands are formed, and rubber penetrates inward at such portions, thereby preventing movement of water.

In the present invention, in order to further improve the rubber penetration property, each of the filaments and/or each of the strands that form a cord may be formed in a wavy shape or in a spiral shape.

Also, in order to improve pairing of a cord, to make the gauge thinner, and to increase the strength, it is preferred that all the sheathes have a structure in which two filaments are paired substantially parallel with each other.

Moreover, in the present invention, from the viewpoint of strength distribution among filaments and manufacture of a cord, it is preferred that the diameter $Dm$ of a filament in a single filament strand and the diameter $Dd$ of a filament in a double filament strand have the following relationship:

$$Dd \leq Dm \leq 2Dd.$$

Experiments:

Radial tires for trucks and buses having a size of 10.00 R20 and having belts formed of steel cords shown in Table 1 were experimentally manufactured, and tests were performed so as to determine resistance to corrosion expansion and resistance to buckling fatigue of each tire. The results of the tests are shown in Tables 1 through 5.

In the test for determining the resistance to corrosion expansion, a tire that had completely worn out due to traveling on bad roads, was examined to measure the length of a corroded portion that extended in the longitudinal direction of a cord from a cut portion in a region subjected to external damage. Among the lengths of corroded portions measured in the above-described manner, the maximum value was taken. In the test for determining the resistance to buckling fatigue, a cord was taken out of each tire that had also completely worn out and was subjected to a rotary bending fatigue test. The fatigue limit distortion obtained during the test is shown as an index in the following tables.

TABLE 1

Figure 3:
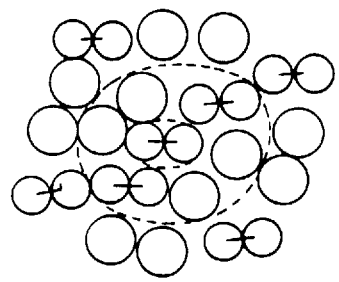

|  | Embodiment 1 | Embodiment 2 | Embodiment 3 |
| --- | --- | --- | --- |
| Structure of cord | 1 × 2 + 6 × 2 + 12 × 2 | 1 × 2 + (2 + 1 + 2 + 1 + 2 + 1) + (2 + 1 + 2 + 1 + 2 + 1 + 2 + 1 + 2 + 1 + 2 + 1) | 1 × 2 + (2 + 1 + 1 + 2 + 1 + 1) + (2 + 1 + 1 + 2 + 1 + 1 + 2 + 1 + 1 + 2 + 1 + 1) |
| Cross section of cord | FIG. 1 | FIG. 2 | FIG. 3 |
| Filament diameter 2 | 0.21 | 0.21 | 0.21 |
| Filament diameter 1 | — | 0.28 | 0.28 |
| Pitch (mm) core/first sheath/second sheath | ∞/16/30 | ∞/16/30 | ∞/16/30 |
| Cord strength (kgf) | 465 | 426 | 408 |
| Corrosion transmission (mm) | 15 | 20 | 20 |
| Resistance to buckling fatigue | 130 | 100 | 100 |

TABLE 2

Figure 7:
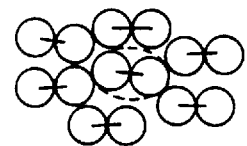
FIGS. 7–10 are cross-sectional views of steel cords according to the present invention.
Figure 8:
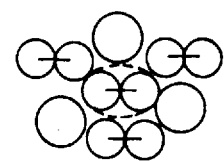
Figure 9:
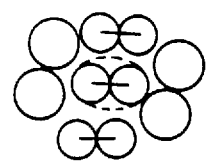

|  | Embodiment 4 | Embodiment 5 | Embodiment 6 |
| --- | --- | --- | --- |
| Structure of cord | 1 × 2 + 6 × 2 | 1 × 2 + (2 + 1 + 2 + 1 + 2 + 1) | 1 × 2 + (2 + 1 + 1 + 2 + 1 + 1) |
| Cross section of | FIG. 7 | FIG. 8 | FIG. 9 |

TABLE 2-continued

|  |  | Embodiment 4 | Embodiment 5 | Embodiment 6 |
|---|---|---|---|---|
| cord |  |  |  |  |
| Filament | 2 | 0.28 | 0.28 | 0.28 |
| diameter | 1 | 0.28 | 0.38 | 0.38 |
| Pitch (mm) core/first sheath/ second sheath |  | ∞/16 | ∞/16 | ∞/16 |
| Cord strength (kgf) |  | 273 | 251 | 241 |
| Corrosion transmission (mm) |  | 10 | 13 | 15 |
| Resistance to buckling fatigue |  | 105 | 80 | 80 |

TABLE 3

Figure 6:
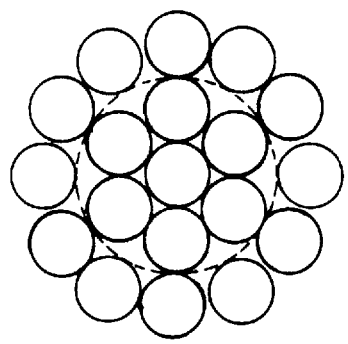
FIG. 6 is a cross-sectional view of a conventional steel cord having a 1+6+12 structure.
Figure 10:
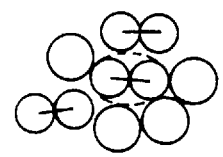

|  | Comparative embodiment 1 | Comparative embodiment 2 | Comparative embodiment 3 |
|---|---|---|---|
| Structure of cord | 1 + 6 + 12 | 1 × 2 + (2 + 1 + 1 + 1 + 2 + 1) | 1 × 2 + (2 + 1 + 1 + 1 + 2 + 1) + (2 + 1 + 1 + 1 + 2 + 1 + 1 + 1 + 2 + 1 + 1 + 1) |
| Cross section of cord | FIG. 6 | FIG. 10 | FIG. 4 |
| Filment 2 | — | 0.28 | 0.21 |
| diameter 1 | 0.28 | 0.38 | 0.28 |
| Pitch (mm) core/first sheath/ second sheath | ∞/16/30 | ∞/16 | ∞/16/30 |
| Cord strength (kgf) | 375 | 240 | 401 |
| Corrosion transmission (mm) | 200 or more | 100 | 120 |
| Resistance to buckling fatigue | 105 | 80 | 100 |

TABLE 4

Figure 5:
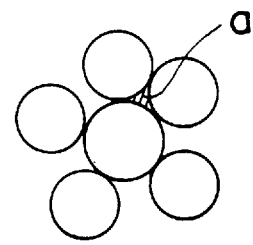
FIG. 5 is a cross-sectional view of a conventional steel cord having a 1+5 structure.

|  | Embodiments | | | | | |
|---|---|---|---|---|---|---|
|  | 1 | 2 | 3 | 4 | 5 | 6 |
| Cross section of code | FIG. 1 | FIG. 2 | FIG. 3 | FIG. 4 | FIG. 5 | FIG. 6 |
| Diameter of single filament (mm) | — | 0.30 | 0.30 | — | 0.26 | 0.26 |
| Diameter of each of paired filaments (mm) | 0.21 | 0.21 | 0.21 | 0.185 | 0.185 | — |
| Pitch (mm) | 16 | 16 | 16 | 16 | 16 | 16 |
| Strength (kgf) | 280 | 286 | 272 | 343 | 352 | 340 |
| Corrosion transmission (mm) | 15 | 20 | 30 | 20 | 25 | 35 |
| Resistance to buckling fatigue | 100 | 70 | 70 | 114 | 81 | 81 |

TABLE 5

|  | Comparative embodiments | | | |
|---|---|---|---|---|
|  | 1 | 2 | 3 | 4 |
| Cross section of cord | FIG. 7 | FIG. 8 | FIG. 9 | FIG. 10 |
| Diameter of single filament (mm) | 0.30 | 0.30 | 0.26 | 0.26 |
| Diameter of each of paired filaments (mm) | — | 0.21 | — | 0.185 |
| Pitch (mm) | 16 | 16 | 16 | 16 |
| Strength (kgf) | 253 | 268 | 312 | 335 |
| Corrosion transmission (mm) | 200~ | 150 | 200~ | 180 |
| Resistance to buckling fatigue | 70 | 70 | 81 | 81 |

In the steel cord for reinforcing a rubber product according to the present invention, rubber penetrates into the interior of the cord, so that the cord can have excellent resistance to corrosion transmission as well as excellent resistance to buckling fatigue. Also, when the cord of the present invention is applied to the belt layer of a pneumatic radial tire, the weight of the pneumatic tire can be decreased.

What is claimed is:

1. A steel cord for reinforcing a rubber product which comprises seven or more strands, wherein at least one of three successively adjacent strands is formed of two filaments that are paired substantially parallel to each other, one of the remaining strands is formed of a single filament, and the direction of pairing said two filaments is substantially the same over the longitudinal length of said cord.

2. A steel cord for reinforcing a rubber product according to claim 1, wherein each of all said strands is formed of two filaments that are paired substantially parallel to each other.

3. A steel cord for reinforcing a rubber product according to claim 1, wherein there exists the following relationship between the diameter Dm of a filament in a single filament strand and the diameter Dd of a filament in a double filament strand:

$$Dd \leq Dm \leq 2Dd.$$

4. A steel cord for reinforcing a rubber product according to claim 3, wherein said filament of said single filaments strand has a wavy shape.

5. A steel cord for reinforcing a rubber product according to claim 3, wherein said filament of said single filament strand has a spiral shape.

6. A steel cord for reinforcing a rubber product according to claim 1, wherein said steel cord is a multilayer structure comprising two or more layers including a core, said core comprises at least one strand formed of two filaments that are paired substantially parallel to each other, and each layer other than said core includes three successively adjacent strands.

7. A steel cord for reinforcing a rubber product according to claim 6, wherein each of all said strands is formed of two filaments that are paired substantially parallel to each other.

8. A steel cord for reinforcing a rubber product according to claim 6, wherein there exists the following relationship between the diameter Dm of a filament in a single filament strand and the diameter Dd of a filament in a double filament strand:

$$Dd \leq Dm \leq 2Dd.$$

9. A steel cord for reinforcing a rubber product according to claim 8, wherein said filament of said single filament strand has a wavy shape.

10. A steel cord for reinforcing a rubber product according to claim 8, wherein said filament of said single filament strand has a spiral shape.

11. A steel cord for reinforcing a rubber product according to claim 1, wherein each of said seven or more strands is twisted in the same direction at the same pitch, and said three adjacent strands are disposed in a triangular pattern in which said adjacent strands are in mutual contact.

12. A steel cord for reinforcing a rubber product according to claim 11, wherein each of all said strands is formed of two filaments that are paired substantially parallel to each other.

13. A steel cord for reinforcing a rubber product according to claim 11, wherein there exists the following relationship between the diameter Dm of a filament in a single filament strand and the diameter Dd of a filament in a double filament strand:

$$Dd \leq Dm \leq 2Dd.$$

14. A steel cord for reinforcing a rubber product according to claim 13, wherein said filament of said single filament strand has a wavy shape.

15. A steel cord for reinforcing a rubber product according to claim 13, wherein said filament of said single filament strand has a spiral shape.

\* \* \* \* \*